United States Patent Office 2,772,188

Patented Nov. 27, 1956

1

2,772,188

AMMONIA INSOLUBILIZED METHYLOL-PHOSPHORUS POLYMERS AND CELLULOSIC MATERIALS IMPREGNATED THEREWITH

Wilson A. Reeves and John D. Guthrie, New Orleans, La., assignors to the United States of America as represented by the Secretary of Agriculture No Drawing. Application November 18, 1953, Serial No. 393,021

9 Claims. (Cl. 117—136)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to processes of increasing the extent of polymerization and insolubility of further polymerizable methylol-phosphorus polymeric materials. Methylol-phosphorus polymeric materials are produced by reacting at least one compound of the group, tetrakis-(hydroxymethyl) phosphonium chloride, tris(hydroxymethyl) phosphine oxide and phosphorus linked methylol group containing derivatives thereof with compounds containing a plurality of groups which yield condensation products with a phosphorus linked methylol group.

The compounds tetrakis(hydroxymethyl) phosphonium chloride and tris(hydroxymethyl) phosphine oxide are hereinafter referred to by their initials THPC and THPO, respectively, and the term "phosphorus compounds" is used exclusively to refer to at least one compound of the group THPC, THPO and phosphorus linked methylol group containing derivatives thereof. The phosphorus linked methylol group containing derivatives are the products of reacting THPC, THPO, or a mixture thereof, with at least one other compound to form a product containing at least two $PCH_2OH$ groups in which the phosphorus atoms are members of pentavalent phosphorus radicals of the group, trimethylene phosphine oxide, $(CH_2)_3PO$, and tetramethylene phosphonium chloride, $(CH_2)_4PCl$.

This application is a continuation in part of our copending applications, Serial Nos. 283,743, now Patent No. 2,668,096 and 283,744, now abandoned, filed April 22, 1952, Serial No. 348,137, now abandoned, filed April 10, 1953, and Serial Nos. 378,435 and 378,437, filed September 3, 1953.

Methylol-phosphorus polymers, as they are being formed, pass through three more or less well defined stages. In these stages the polymers may be regarded as: (*a*) water soluble resinoids, (*b*) medium molecular weight resinoids which are practically insoluble in water, and (*c*) insolubilized resinoids which are practically insoluble in substantially all inert liquids. In general, the rate of the polymerization increases very materially with increases in temperature, and the monomers and further polymerizable polymers can be converted from one stage to another by the application of heat. However, in some important uses of the polymers, e. g., as flameproofing protective coatings on textile materials, the application of heat tends to induce undesired changes, e. g., decreases in textile tear strength, and the like properties.

An object of this invention is to provide processes of rapidly insolubilizing further polymerizable methylol-phosphorus polymers without the application of heat. A further object is to provide processes of incorporating strongly bound nitrogen atoms into the polymolecules of methylol-phosphorus polymers.

2

In general, the process of this invention comprises reacting a further polymerizable methylol-phosphorus polymeric material containing a methylol-phosphorus group with ammonia.

Illustrative examples of methylol-phosphorus polymeric materials which can be reacted with ammonia include further polymerizable polymeric materials containing a methylol-phosphorus group produced by reacting at least one phosphorus compound with at least one nitrogen compound containing at least two members of the group, hydrogen atoms and methylol radicals, attached to trivalent nitrogen atoms, e. g., melamine or a water soluble methylol melamine; a polyamine such as hexamethylene pentamine; a primary or secondary aliphatic, alicyclic or aromatic amine, such as cetylamine, cyclohexylamine, aniline or diethanol amine; a cyclic imine compound such as ethylenimine or polyethylenimine; a plurality of nitrogen compounds such as a water soluble methylol malamine and urea, or a water soluble methylol melamine and a primary or secondary amine; a polypeptide such as poly(hexamethylene adipamid), or a protein; at least one phenolic compound such as a phenol, a naphthol or an aromatic compound containing a plurality of hydroxyl groups attached to aromatic rings; a plurality of phosphorus linked methylol group reactive compounds, e. g., at least one phenolic compound and at least one nitrogen compound; and the like.

Our co-pending applications, Serial Nos. 393,022 and 393,023, filed of even date, describe the polymeric compounds producible from ethylenimine and polypeptide compounds, respectively, in greater detail.

The process of this invention is particularly useful in the insolubilization of nitrogen methylol-phosphorus polymers in situ as coating and impregnating materials. Preferred nitrogen methylol phosphorus polymers are produced by reacting at least one phosphorus compound with (*a*) at least one monomeric nitrogen compound containing at least two members of the group hydrogen atoms and methylol radicals attached to trivalent nitrogen atoms or (*b*) a plurality of phosphorus linked methylol group reactive compounds predominating in such a nitrogen compound. The present process is especially useful in insolubilizing nitrogen methylol-phosphorus polymers in contact with cellulosic materials, such as textiles or wood materials, or as an impregnating material therefor.

Particularly suitable nitrogen methylol-phosphorus polymeric textile impregnating materials consist of polymers of a mixture of THPC and THPO with a water soluble methylol melamine, or with a mixture of melamine, guanidine, urea, and their water soluble methylol derivatives, or with mixtures of melamine, guanidine, and urea containing formaldehyde along with an effective amount of a "built-in" textile softening agent, comprising, a polymer of a mixture of THPC and THPO with a long chain aliphatic primary amine, such as cetyl amine. Textiles are preferably impregnated with such impregnating materials by wetting the textile with liquids consisting essentially of water solutions or dispersions of each of the above types of polymers in their (*a*) or (*b*) stages. The presence of relatively minor amounts of the long chain aliphatic primary amine polymer as a textile impregnating agent or a component thereof materially decreases the tendency of the textile to undergo losses in tear strength when subjected to a plurality of launderings.

In reacting a further polymerizable methylol-phosphorus polymer with ammonia, the ammonia can be employed in the form of gaseous ammonia, ammonium hydroxide, a solution of ammonia in an inert solvent, or as ammonia released in situ by the reaction of a compound capable of releasing ammonia, e. g., an ammonium salt of a weak acid, such as ammonium acetate.

The reaction can be conducted at pressures above, below or equal to atmospheric pressure, atmospheric pressure being preferred, and can be conducted at temperatures of from about 0° C. to the decomposition temperature of the products room temperature being preferred.

The further polymerizable methylol-phosphorus polymeric materials can be reacted in the form of bulk polymers, components of solutions containing the polymeric materials, or in situ in and on the surface of materials impregnated with the polymers.

The following examples are illustrative of details of this invention:

NITROGEN METHYLOL-PHOSPHORUS POLYMERS

*Example 1*

16.2 parts of THPC were dissolved in 16 parts of water and the pH of the solution was adjusted to about 7.0 by adding triethanolamine. To the solution were added 11.6 parts of methylolmelamine dissolved in 50 parts of water containing 8.4 parts of urea. The resulting solution was thoroughly mixed, and ten parts of concentrated $NH_4OH$ were added with stirring.

Within 10 seconds after the $NH_4OH$ was added, a white, insoluble granular resin was formed. The resin was insoluble in water, ethanol, benzene, acids and hot alkali.

*Example 2*

A piece of 8 oz. cotton twill was impregnated with a solution prepared as described in example 1 (prior to the addition of $NH_4OH$) by immersing the fabric in the aqueous solution, then passing the wet fabric through squeeze rolls set at a tight nip, to give about 65% wet pickup.The impregnated fabric was dried 4 minutes at 90° C. The dry fabric was padded through concentrated $NH_4OH$, then washed in tap water and air dried.

The dried fabric was flame resistant, passing the vertical flame test (Fed. Spec. CCC–T–191b). The fabric contained 1.7% phosphorus. After a sample of this fabric was boiled in 1% $N^aOH$ for 3 hours, it contained 1.2% phosphorus and would still pass the flame test.

PHENOLIC METHYLOL-PHOSPHORUS POLYMERS

*Example 3*

Three parts of phloroglucinol and four parts of THPC were dissolved in 15 parts of 50% ethanol. The solution was boiled for 10 minutes, producing a water soluble phenolic methylol-phosphorus polymer. This polymer was cooled to room temperature (25° C), and concentrated ammonium hydroxide was added, until the pH was about 5.5. During the addition, a slight exothermic reaction occurred, causing the temperature to rise to about 35° C.

Within one minute the entire sample of water soluble polymer was converted to a highly cross-linked insoluble polymer. The light colored resin was broken up and ground in a mortar, then washed in large quantities of water and ethanol then air dried. The washed insolubilized polymer contained 9.9% phosphorus and 3.3% nitrogen.

We claim:

1. A process comprising reacting a further polymerizable methylol-phosphorus polymeric material containing at least one free methylol group attached to a phosphorus atom with ammonia.

2. A process for increasing the flame-resistance of a cellulosic material which comprises impregnating the cellulosic material with an aqueous solution of at least one further polymerizable polymer containing at least one free methylol group attached to a phosphorus atom, said polymer having been produced by reacting at least one compound from the group consisting of tetrakis (hydroxymethyl) phosphonium chloride, tris (hydroxymethyl) phosphine oxide and phosphorus-linked methylol group containing derivatives thereof, with at least one nitrogen compound containing at least two members of the group consisting of hydrogen and methylol radicals attached to trivalent nitrogen atoms, said aforementioned derivatives having been produced by reacting a member of the group consisting of tetrakis(hydroxymethyl) phosphonium chloride, tris(hydroxymethyl) phosphine oxide, and mixtures thereof with at least one other compound to form a product containing at least two $PCH_2OH$ groups in which the phosphorus atoms are members of pentavalent phosphorus radicals of the group consisting of trimethylene phosphine oxide and tetramethylene phosphonium chloride, drying the impregnated cellulosic material, and insolubilizing the polymer in situ by reacting it with ammonia.

3. A process of insolubilizing a further polymerizable polymer of a mixture of tetrakis(hydroxymethyl) phosphonium chloride and tris(hydroxymethyl) phosphine oxide with a water soluble methylol melamine, said polymer containing at least one free methylol group attached to a phosphorus atom, which comprises reacting said polymer with ammonium hydroxide.

4. The process of claim 2 in which the nitrogen compound is a water soluble methylol melamine.

5. The process of claim 2 in which the dried cellulosic material is impregnated with aqueous ammonia.

6. A process of incorporating nitrogen into a further polymerizable polymer containing at least one free methylol group attached to a phosphorus atom produced by reacting at least one compound of the group consisting of tetrakis(hydroxymethyl) phosphonium chloride, tris(hydroxymethyl) phosphine oxide, and phosphorus linked methylol group containing derivatives thereof, said derivatives having been produced by reacting a member of the group consisting of tetrakis (hydroxymethyl) phosphonium chloride, tris(hydroxymethyl) phosphine oxide, and a mixture thereof with at least one other compound to form a product containing at least two $PCH_2OH$ groups in which the phosphorus atoms are members of pentavalent phosphorus radicals of the group consisting of trimethylene phosphine oxide and trimethylene phosphonium chloride, with a compound containing a plurality of groups which yield condensation products with a phosphorus linked methylol group, which process comprises, reacting said polymer with ammonia.

7. Process of claim 6 in which the reaction is effected by impregnating a cellulosic material with an aqueous liquid containing the polymer, drying the wet cellulosic material, and impregnating the dried material with ammonium hydroxide.

8. The process of claim 3 in which the reaction is effected by impregnating a cellulosic textile with the further polymerizable polymer, drying the wet textile, and impregnating the dried textile with ammonium hydroxide.

9. A process of increasing the nitrogen content of a further polymerizable phenolic methylol-phosphorus polymer containing at least one free methylol group attached to a phosphorus atom comprising, mixing ammonium hydroxide with an aqueous liquid containing a further polymerizable polymer of tetrakis(hydroxymethyl) phosphonium chloride and phloroglucinol.

References Cited in the file of this patent

UNITED STATES PATENTS 2,668,096 Reeves ---------------- Feb. 2, 1954